(12) United States Patent
Wirsch, Jr. et al.

(10) Patent No.: US 9,035,507 B2
(45) Date of Patent: May 19, 2015

(54) ELECTRIC MACHINE AND RECTIFIER ASSEMBLY THEREFOR

(71) Applicants: GE Aviation Systems LLC, Grand Rapids, MI (US); Powerex, Inc., Youngwood, PA (US)

(72) Inventors: Paul James Wirsch, Jr., Springboro, OH (US); Hao Huang, Troy, OH (US); Donald Kevin Morozowich, Irwin, PA (US)

(73) Assignees: Aviation Systems, LLC, Grand Rapids, MI (US); Powerex, Inc., Youngwood, PA (US)

( * ) Notice: Subject to any disclaimer, the term of this patent is extended or adjusted under 35 U.S.C. 154(b) by 319 days.

(21) Appl. No.: 13/752,942

(22) Filed: Jan. 29, 2013

(65) Prior Publication Data
US 2014/0210320 A1     Jul. 31, 2014

(51) Int. Cl.
  *H02K 5/22*     (2006.01)
  *H02K 11/00*    (2006.01)
  *H02K 11/04*    (2006.01)

(52) U.S. Cl.
  CPC ............ *H02K 5/225* (2013.01); *H02K 11/0073* (2013.01); *H02K 11/04* (2013.01); *H02K 11/042* (2013.01)

(58) Field of Classification Search
  CPC ..... H02K 11/04; H02K 5/225; H02K 11/042; H02K 11/0073
  USPC .................................................. 310/68 D, 71
  See application file for complete search history.

(56) References Cited

U.S. PATENT DOCUMENTS

| | | | |
|---|---|---|---|
| 3,348,127 A | 10/1967 | Petersen | |
| 4,745,315 A | 5/1988 | Terry, Jr. et al. | |
| 5,001,376 A | 3/1991 | Iseman | |
| 5,414,318 A | 5/1995 | Shimizu et al. | |
| 6,903,470 B2 | 6/2005 | Doherty et al. | |
| 7,166,943 B2 | 1/2007 | Johnsen | |
| 7,944,100 B2 | 5/2011 | Lemmers, Jr. et al. | |
| 2003/0164651 A1 | 9/2003 | Tomquist et al. | |
| 2006/0176720 A1* | 8/2006 | Lemmers et al. | 363/145 |
| 2007/0108854 A1* | 5/2007 | Osborn et al. | 310/68 D |
| 2010/0019628 A1 | 1/2010 | Kitzmiller et al. | |
| 2010/0283357 A1 | 11/2010 | Lemmers, Jr. et al. | |
| 2011/0062807 A1* | 3/2011 | Berry | 310/71 |
| 2011/0296672 A1 | 12/2011 | Ganong et al. | |

FOREIGN PATENT DOCUMENTS

| | | |
|---|---|---|
| EP | 1788693 B1 | 9/2009 |
| GB | 1183291 A | 2/1968 |
| GB | 1507755 A | 4/1978 |
| GB | 2015252 A | 9/1979 |
| JP | 2005320086 A | 11/2005 |
| WO | 9013144 A1 | 11/1990 |

OTHER PUBLICATIONS

GB Combined Search and Examination Report issued in connection with corresponding Application No. GB1403209.8 on Aug. 29, 2014.
Written Opinion for PCT/US2013/043814 dated Mar. 4, 2014.

* cited by examiner

*Primary Examiner* — Hanh Nguyen
(74) *Attorney, Agent, or Firm* — General Electric Company; William S. Munnerlyn

(57) ABSTRACT

An electric machine having a rectifier assembly placed within a rotating shaft of the electric machine to convert the AC output of the electric machine to DC prior to transmission of the electricity from the electric machine.

20 Claims, 4 Drawing Sheets

ELECTRIC MACHINE AND RECTIFIER ASSEMBLY THEREFOR

BACKGROUND OF THE INVENTION

Electric machines, such as electric motors and/or electric generators, may be used in the generation of electricity. In the aircraft industry, it is common to find combination motor/generators, where the motor is used to power the generator. Regardless of the configuration, generators typically include a generator rotor having main windings that are driven to rotate by a source of rotation, such as an electrical or mechanical machine, which for some aircraft may be a gas turbine engine.

BRIEF DESCRIPTION OF THE INVENTION

A rectifier assembly for placement within a rotating shaft of an electric machine having a first machine providing an alternating current output and a second machine receiving a direct current input, with the rectifier assembly converting the alternating current output to the direct current input, the rectifier assembly includes at least one electrical ring having at least one diode seat, at least one isolating ring adjacent the at least one electrical ring, a terminal bar overlying the at least one diode seat, and a clamping bar overlying the terminal bar, wherein the clamping bar is affixed to the at least one isolating ring to press the terminal bar toward the diode seat to clamp a diode seated on the diode seat between the terminal bar and the at least one electrical ring.

DESCRIPTION OF EMBODIMENTS OF THE INVENTION

One embodiment of invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, while this description is primarily directed toward an aircraft environment, one embodiment of invention is applicable in any environment using an electric machine.

Figure 1:
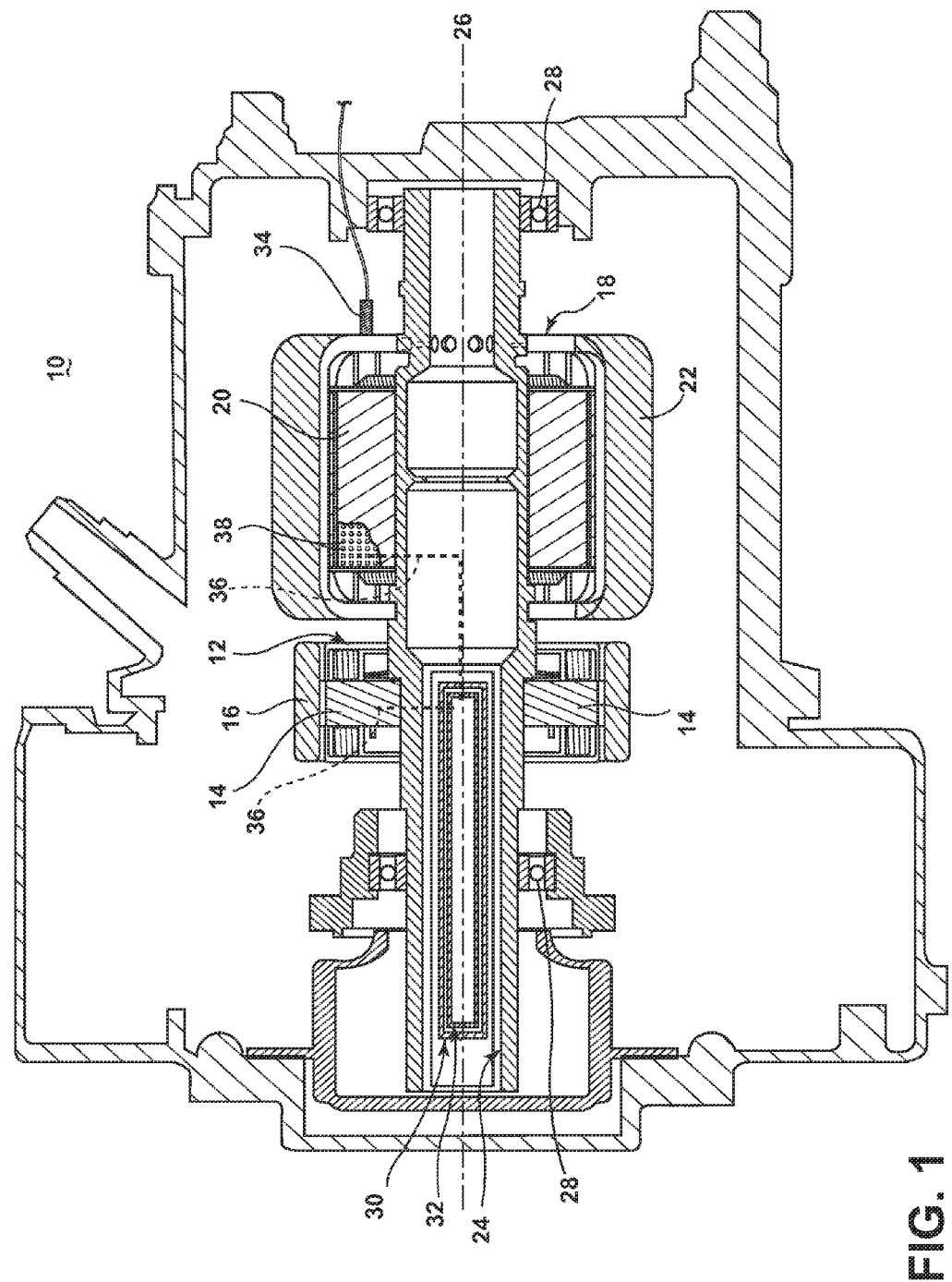
FIG. 1 is a sectional view of an electrical machine assembly.

Turning to an exemplary embodiment of the invention, FIG. 1 schematically illustrates an electrical machine assembly 10 comprising a first machine 12 having an exciter rotor 14 and an exciter stator 16, and a second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 34, to the electrical load and may provide for a three phase with a ground reference output from the electrical machine assembly 10.

The electrical machine assembly 10 further comprises a rotatable shaft 24 mechanically coupled to a source of axial rotation, which may be a gas turbine engine (not shown), about a common axis 26. The rotatable shaft 24 is supported by spaced bearings 28. The exciter rotor 14 and main machine rotor 20 are mounted to the rotatable shaft 24 for rotation relative to the stators 16, 22, which are rotationally fixed within the electrical machine assembly 10. The stators 16, 22 may be mounted to any suitable part of a housing portion of the electrical machine assembly 10.

The rotatable shaft 24 further comprises at least a hollow portion for enclosing a shaft tube 30, which is contemplated to be non-conducting. The shaft tube 30 is rotationally coupled for co-rotating with the rotatable shaft 24 and further houses a rectifier assembly 32, insulating the rectifier assembly 32 from the rotatable shaft 24.

The exciter rotor 14 is electrically connected to the rectifier assembly 32 by way of conductors 36 (schematically shown as dotted lines). Additionally, the rectifier assembly 32 is electrically connected to the main windings 38 of the main machine rotor 20 by way of conductors 36.

Figure 2:
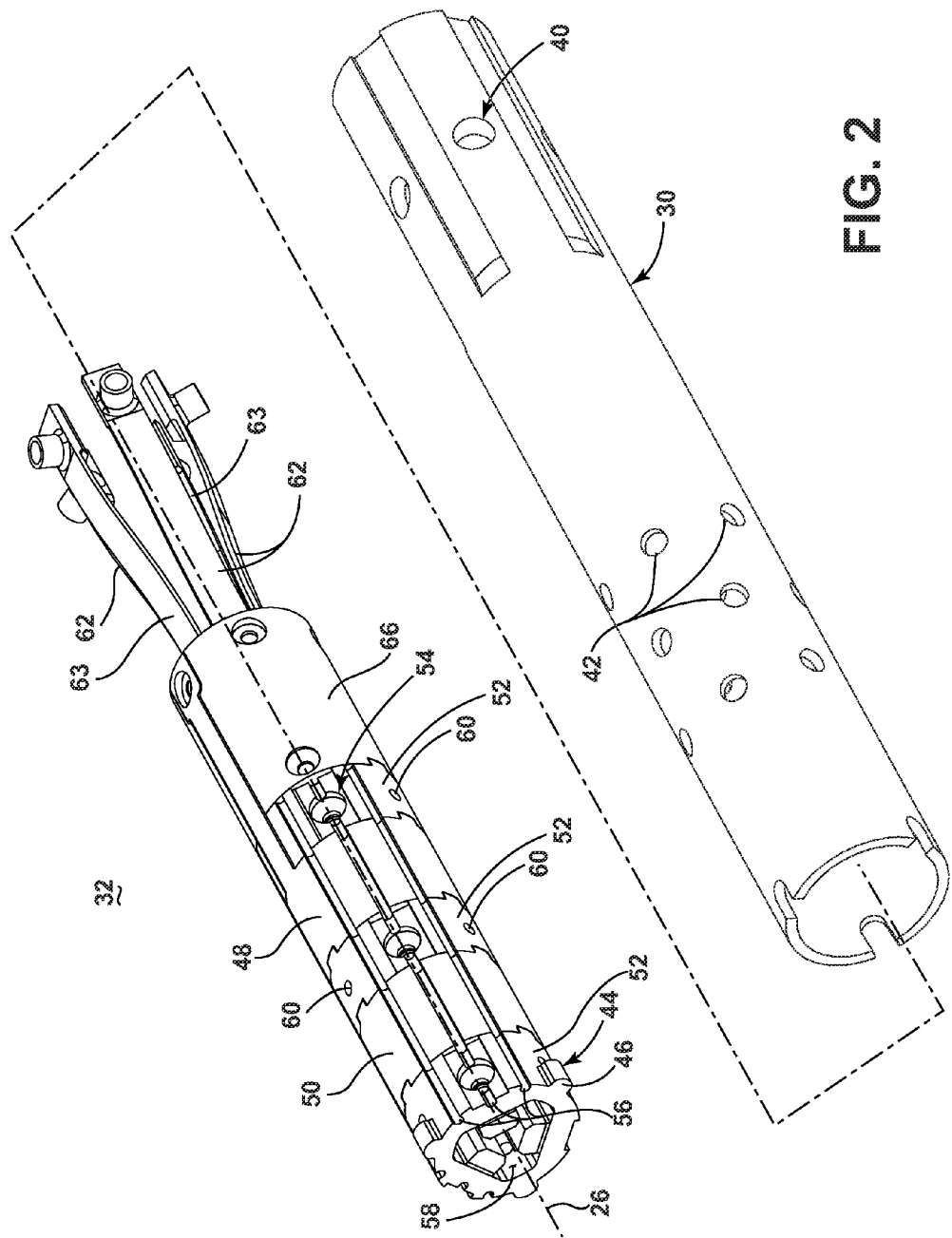
FIG. 2 is a perspective view of the rectifier assembly within the shaft tube.

Turning now to FIG. 2, the details of shaft tube 30 and rectifier assembly 32 will be described. The shaft tube 30 has a substantially cylindrical structure with opposing open ends, and includes five mounting connector openings 40 spaced radially near the aft of the tube 30. The shaft tube 30 is also shown having optional access openings 42, some of which are radially aligned for accessing portions of the rectifier assembly 32.

The rectifier assembly 32 comprises an outer structure having at least one electrical ring and at least one isolating ring 52 that electrically isolates at least a portion of the adjacent electrical rings. The isolating ring 52 may be made of non-conductive material to provide the electrical isolation. The illustrated embodiment shows a conductive first electrical ring 48, a conductive second electrical ring 50, and three isolating rings 52 in an alternating, adjacent placement. Each isolating ring 52 further comprises mechanical fastener openings 54.

The electrical rings 48, 50 and isolating rings 52 comprise coolant grooves 56 that are radially spaced on the external surface of the rings 48, 50, 52. The coolant grooves 56 are configured such that the grooves 56 align axially along the outer structure when the electrical rings 48, 50 and isolating rings 52 placed adjacently to one another. The coolant grooves 56 provide a channel for coolant to flow along the length of the electrical rings 48, 50 and isolating rings 52.

Additionally, the electrical rings 48, 50 and isolating rings 52 partially define an axial coolant passage 58, extending axially along the interior of the rings 48, 50, 52. The axial coolant passages 58 allow coolant to flow through the interior of the rectifier assembly 32. The isolation rings 52 further comprise radial coolant passages 60, holes connecting the axial coolant passages 58 to the external surface of the rings 52, configured to allow coolant to flow between the interior and exterior of the rectifier assembly 32.

Alternate placement of the electrical rings 48, 50 and isolating rings 52 are envisioned. For example, in another embodiment, there may be two electrical rings 48, 50 separated by a single isolating ring 52. In yet another embodiment, two electrical rings 48, 50 may be in electrical contact with each other, with a single isolating ring 52 adjacent to either electrical ring 48, 50.

As shown, the foremost isolating ring 52 comprises three assembly ridges 46 spaced radially and extending normally from the external surface of the ring 52. The shaft tube 30 further comprises cuts 44 spaced radially at the fore of the tube 30. The rectifier assembly 32 and the shaft tube 30 are assembled such that the rectifier assembly 32 is received by the foremost opening of the tube 30 along the common axis 26. When fully received within the shaft tube 30, assembly ridges 46 and the tube cuts 44 are configured to align axially such that the rectifier assembly 32 and the shaft tube 30 may not rotate independently.

The rectifier assembly 32 further comprises conducting AC buss bars 62, DC buss bars 63, and a spacer ring 66.

Figure 3:
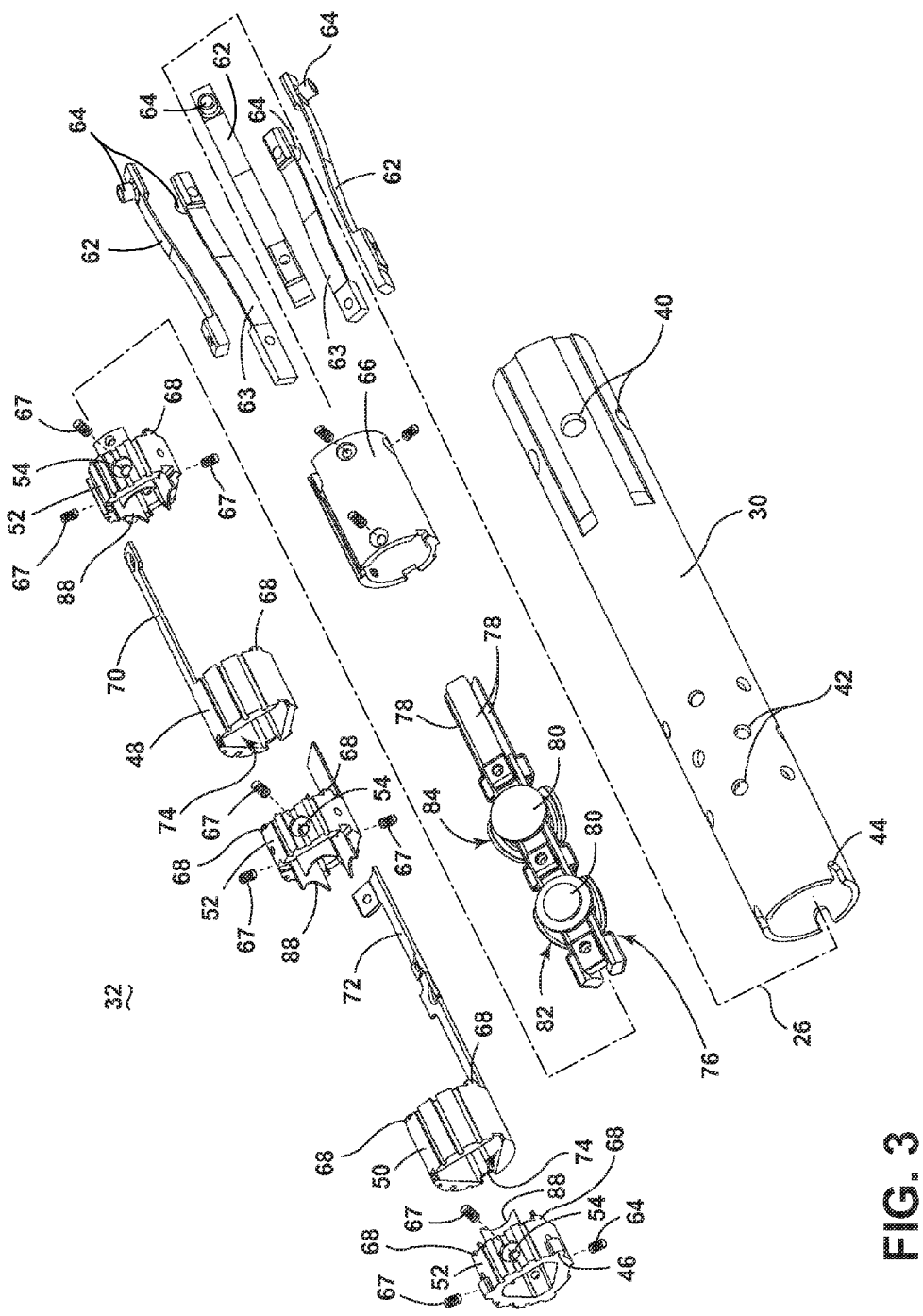
FIG. 3 is an axially exploded view of the rectifier assembly and shaft tube.

FIG. 3 illustrates an axially-exploded perspective view of the rectifier assembly, exploded along the common axis 26. As illustrated, the three AC buss bars 62 receive the respective three-phase AC output of the exciter rotor 14. Additionally, as illustrated, two DC buss bars 63 are used for the transmission of the DC output to the second machine 18. The buss bars 62, 63 are shown radially spaced about the rectifier assembly 32 axis. Alternate arrangements and quantities of AC and DC buss bars 62, 63 are envisioned based on the electrical machine assembly 10 needs and configuration.

The buss bars 62, 63 comprise a first end and a second end, with the first end having mounting connectors 64 for securing the first end of the bars 62 to the first and second machines 12, 18 by way of conductors 36. As illustrated, the mounting connectors 64 are formed simultaneously and conjoined with the first end of the buss bars 62, 63. Alternatively, a fastening component may be provided to aid in the mounting of the mounting connectors 64 to the first end of the buss bars 62, 63. Alternatively, non-mechanical fasteners, such as welding or adhesive may also be used.

The mounting connectors 64 and mounting connector openings 40 are configured such that when the shaft tube 30 and the rectifier assembly 32 are assembled, the connectors 64 are received by the openings 40 to provide for electrical connections between the AC connectors 64 and the first machine 12, and the DC connectors 64 and the second machine 18. The electrical connections may be any suitable mechanical or non-mechanical fasteners.

The rectifier assembly 32 is further shown comprising an optional spacer ring 66 positioned between the electrical and isolating rings 48, 50, 52, and the buss bars 62, 63. The spacer ring 66 is configured with mechanical fasteners 67, such as heli-coils, to allow for fastening to both the isolating ring 52 and the second end of the buss bars 62, 63. The mechanical fasteners 67 are configured to provide for alignment and fastening of the AC input terminals 78 and DC output terminals 70, 72 to their respective AC and DC buss bars 62, 63. An alternate embodiment wherein the AC and DC terminals 70, 72, 78 are directly secured to the respective AC and DC buss bars 62, 63 without the use of a space ring 66 is envisioned. Other suitable mechanical fasteners, e.g. screws, bolts, nails, pins, etc., may be used as well.

The electrical rings 48, 50, isolating rings 52, and spacer ring 66 are shown with corresponding notches 68, allowing the rings 48, 50, 52, 66 to secure to each other to allow for alignment and prevent independent rotation. Alternate physical or keyed notch 68 configurations allowing for proper alignment are envisioned.

The rectifier assembly is shown comprising a diode assembly 76 having circular diodes 80. As illustrated, the diode assembly 76 comprises a set of three outward-facing, forward-biased diodes 82 and three inward-facing, reversed-biased diodes 84, with each set 82, 84 configured around a center structure in a substantially triangular manner.

The diode assembly 76 further comprises a first end having AC terminals 78. When the rectifier assembly 32 is assembled, the three AC terminals 78 extend axially towards aft, through the spacer ring 66, to be electrically secured to the respective AC buss bars 62.

As illustrated, the first electrical ring 48 further comprises a first DC terminal 70 and the second electrical ring 50 further comprises a second DC terminal 72. Each of the DC terminals 70, 72 extend axially on the external surface of the isolating rings 52 towards the DC buss bars 63. When the rectifier assembly 32 is assembled, each of the DC terminals 70, 72 are electrically secured to the respective two DC buss bars 63.

The first electrical ring 48 and the second electrical ring 50 further comprise at least one diode seat 74, providing an electrically conductive, substantially flat internal surface for receiving a diode 80. As illustrated, each electrical ring 48, 50 has three diode seats 74, defining a substantially triangular inner surface of the rings 48, 50.

The isolating rings 52 further comprise diode securing sidewalls 88 positioned axially away from the rings 52 and having semicircular structures for abutting the circular diodes 80. Furthermore, each isolating ring 52 further comprises mechanical fastener openings 54 for receiving a mechanical fastener 67, illustrated as a heli-coil.

Figure 4:
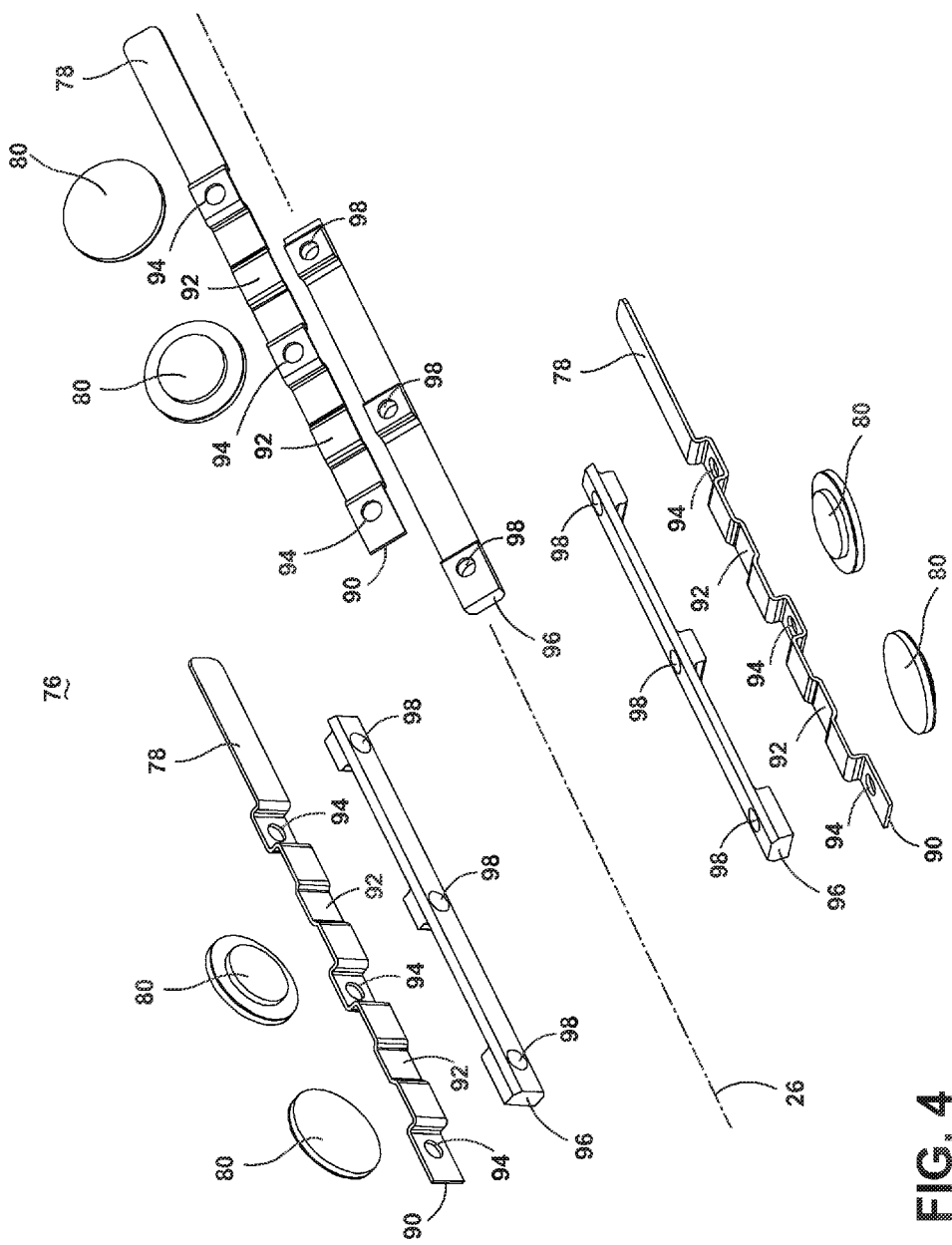
FIG. 4 is a radially exploded view of the diode assembly.

Turning now to FIG. 4, the diode assembly 76 will be defined in greater detail. The diode assembly 76 further comprises conductive terminal bars 90 having physical protrusions 92, fastener pass-through openings 94, and the aforementioned AC terminals 78. The terminal bars 90, as embodied, are formed from copper, but may alternately be formed or machined by any suitable conductive material. The physical protrusions 92 extend slightly normally outward, with a surface suitable for making conductive contact with one diode 80 from each diode set 82, 84. Alternate physical protrusions 92 are envisioned for making conductive contact with the diodes 80.

The diode assembly 76 further comprises isolating clamping bars 96 that electrically isolate at least a portion of the one AC terminal 78 from adjacent terminals 78. The clamping bars 96 may be made of non-conductive material to provide the electrical isolation. Each clamping bar 96 includes at least one a threaded fastener base 98 for receiving the mechanical fastener 67. In alternate mechanical fastener embodiments, the fastener base 98 would be replaced by a suitable mounting point.

The fastener bases 98 of a clamping bar 96 are configured to correspond with both the fastener pass-through openings 94 of a terminal bar 90 and the mechanical fastener openings 54 of the isolating rings 52. Likewise, the first electrical ring 48 set of diode seats 74 are configured to correspond with the reverse-biased diode set 84 and one set of physical protrusions on the terminal bars 90, and the second electrical ring 50 set of diode seats 74 are configured to correspond with the forward-biased diode set 82 and the other set of physical protrusions on the terminal bars 90.

The assembling of the diode assembly 76 will now be described in further detail. When the first and second electrical rings 48, 50 and the isolating rings 52 are adjoined, diodes 80 are overlain on the surface of each of the diode seats 74, such that the seats 74 of the first electrical ring 48 are overlain with the reverse-biased diode set 84 and the seats 74 of the second electrical ring 50 are overlain with the forward-biased diode set 82. Each diode 80 is then overlain with one of the three terminal bars 90, followed by each terminal bar 90 being overlain by a clamping bar 96. Finally, a mechanical fastener 67 is inserted into each mechanical fastener opening 54 of the isolating rings 52, extending through the fastener pass-through openings 94 of the terminal bars 90, and fastened into the fastener base 98 of the clamping bar.

The fastening of the mechanical fastener 67 into the fastener base 98 compresses the clamping bar 96 against the inner surface of the isolating rings 52, such that the physical protrusions 92 clamp the diodes 80 radially against the first and second electrical rings 48, 50. The diode securing sidewalls 88 of the isolating rings 52 further clamp the diodes 80 axially, to prevent unintended electrical contacts from occurring.

The rectifier assembly 32 is axially secured to the shaft tube 30 when the mounting connectors 64 are secured to the first and second machines 12, 18 through the mounting connector openings 40. Additionally, when fully assembled, at least a portion of the access openings 42 align with the mechanical fastener openings 54 of the isolating rings 52, allowing visual inspection and adjustment of the mechanical fastener.

During generator operation, the rotatable shaft 24 is driven by the source of axial rotation. The rotation of the mounted exciter rotor 14, adjacent to the exciter stator 16, generates a three-phase AC current, which is delivered to three respective AC buss bars 62 by the conductors 36 and mounting connectors 64. Each phase of the AC current is transmitted from the buss bar 62 to the AC terminal 78, and resultantly, to one diode 80 from each forward and reversed-biased diode set 82, 84. The diodes operate to rectify the full wave AC current to DC current. At zero or low RPMs of the rotatable shaft 24, the diodes 80 are compressively retained in place by the physical protrusions 92 of the AC terminal 78, as drawn against the diodes 80, to the diode seat 74 of the electrical rings 48, 50 by the mechanical fasteners 67. At higher RPMs, centrifugal force, in addition to the compressive force, help to retain the diodes 80 in place.

The reversed-biased diode set 84 outputs DC current to the first electric ring 48 and the forward-biased diode set 82 outputs DC current to the second electric ring 50. The two DC output currents are delivered to the respective DC buss bars 63, where they are transmitted by the mounting connectors 64 and conductors 36 into the main windings 38 of the main machine rotor 20. The rotation of the main machine rotor 20 about the main machine stator 22 generates the electricity that is used to power the generator load.

During operation of the electrical machine assembly 10, the configuration of the coolant grooves 56, the axial coolant passage 58, and the radial coolant passages 60 allows for coolant to traverse the interior and exterior of the rectifier assembly 32, cooling any transient or steady-state temperature conditions that develop at the electrical rings 48, 50, the isolating rings 52, or the diode assembly 76. Alternate coolant configurations are envisioned.

Many other possible embodiments and configurations in addition to that shown in the above figures are contemplated by the present disclosure. For example, one embodiment of the invention contemplates alternate configurations of forward or reverse-biased diode sets that may provide for half-wave rectification. Another example may include a single electrical ring wherein both diode sets rectify the current to a single DC output. Yet another example of the invention contemplates using a self-contained oil system for cooling, or air for cooling. Furthermore, a different example of the invention may forgo the shaft tube 30 altogether and provide for the rectifier assembly to be received directly into the rotatable shaft. Moreover, the design and placement of the various components may be rearranged such that a number of different in-line configurations could be realized.

One advantage that may be realized in the above embodiments is that the above described embodiments have superior weight and size advantages over the conventional type generator rectification systems. With the proposed rotating arrangement, current rectification can be achieved without the external space constraints of additional circuitry. Additionally, the construction and assembly of the rectifier will result in reduced maintenance downtime. Yet another advantage of the above embodiments is that the oil or coolant already present in the rotating shaft may be used to maintain the rectifier assembly, saving additional weight and size of a separate component. A further advantage of the above embodiments is that it reduces the risks of the diode bridge electrically shorting to a metallic shaft. Moreover, a high peripheral speed (up to 42,000 RPM) can be achieved due to the reduced centrifugal forces of moving the assembly closer to the common axis of rotation. The higher peripheral speed results in a lower generator electromagnetic weight.

When designing aircraft components, important factors to address are size, weight, and reliability. The above described rectifier assembly have a decreased number of parts as the system will be able to provide rectified DC outputs with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rectifier assembly for placement within a rotating shaft of an electric machine assembly having a first machine providing an alternating current output and a second machine receiving a direct current input, with the rectifier assembly converting the alternating current output to the direct current input, the rectifier assembly comprising:
    at least one electrical ring having at least one diode seat;
    at least one isolating ring adjacent the at least one electrical ring;
    a terminal bar overlying the at least one diode seat; and
    a clamping bar overlying the terminal bar;
    wherein the clamping bar is affixed to the at least one isolating ring to press the terminal bar toward the diode seat to clamp a diode seated on the diode seat between the terminal bar and the at least one electrical ring.

2. The rectifier assembly of claim 1 wherein the rectifier assembly comprises multiple electrical rings separated by the at least one isolating ring.

3. The rectifier assembly of claim 2 wherein the rectifier assembly comprises multiple isolating rings alternatingly arranged with the multiple electrical rings.

4. The rectifier assembly of claim 3 further comprising a first direct current terminal extending from one of the electrical rings and a second direct current terminal extending from another of the electrical rings.

5. The rectifier assembly of claim 4 further comprising a first direct current bus bar coupled to the first direct current terminal and a second direct current bus bar connected to the second direct current terminal.

6. The rectifier assembly of claim 5 wherein each of the electrical rings has at least three diode seats and the terminal bar comprises three terminal bars, with each terminal bar overlying a diode seat in each of the electrical rings to form first, second and third alternating current terminals, respectively.

7. The rectifier assembly of claim 6 further comprising a first, second, and third alternating current bus bars connected to the first, second, third alternating current terminals, respectively.

8. The rectifier assembly of claim 7 wherein the clamping bar comprises three clamping bars, with each of the clamping bars corresponding to each of the terminal bars.

9. The rectifier assembly of claim 8 further comprising a mounting connector provided on an end of the bus bars for securing the end of the bus bars to the electric machine assembly.

10. The rectifier assembly of claim 9 further comprising a shaft tube having a hollow interior in which the electrical rings and bus bars are received, and the shaft tube has an opening corresponding to each mounting connector providing for passage of the mounting connector through the shaft tube.

11. The rectifier assembly of claim 10 further comprising coolant grooves extending along the exterior of the electrical rings and the isolating rings.

12. The rectifier assembly of claim 11 further comprising an axial coolant passage partially defined by the electrical rings and the isolating rings.

13. The rectifier assembly of claim 12 further comprising radial coolant passages fluidly coupling the axial coolant passage to the coolant grooves.

14. An electric machine assembly comprising:
a first machine having a first rotor and a first stator and configured to provide an alternating current output;
a second machine having a second rotor and a second stator and configured to receive a direct current input;
a rotatable shaft on which are mounted the first rotor and the second rotor, with the shaft having a hollow portion; and
a rectifier assembly located within the hollow portion and electrically coupling the alternating current output to the direct current input, the rectifier assembly comprising:
a first electrical ring having at least one diode seat and a first direct current terminal;
a second electrical ring having at least one diode seat and a second direct current terminal;
an isolating ring separating the first and second electrical rings;
a terminal bar overlying the at least one diode seat on each of the first and second electrical rings; and
a clamping bar overlying the terminal bar;
wherein the clamping bar is affixed to the isolating ring to press the terminal bar toward the diode seat to clamp a diode seated on the diode seat between the terminal bar and at least one of the first and second electrical rings.

15. The electric machine assembly of claim 14 wherein the first machine comprises an exciter and the second machine comprises a generator.

16. The electric machine assembly of claim 15 wherein the rotatable shaft comprises an open end in communication with the hollow portion, whereby the rectifier assembly made be slid through the open end into the hollow portion.

17. The electric machine assembly of claim 16 further comprising a first direct current bus bar coupled to the first direct current terminal and a second direct current bus bar connected to the second direct current terminal.

18. The electric machine assembly of claim 17 further comprising a mounting connector provided on an end of the bus bars for securing the end of the bus bars to the electric machine assembly.

19. The electric machine assembly of claim 18 further comprising a shaft tube having a hollow interior in which the electrical rings and bus bars are received, and the shaft tube has an opening corresponding to each mounting connector providing for passage of the mounting connector through the shaft tube.

20. The electric machine assembly of claim 19 further comprising a first fastener coupling the clamping bar to the isolating ring, and a second fastener coupling the mounting connector to the electric machine.

* * * * *

UNITED STATES PATENT AND TRADEMARK OFFICE
CERTIFICATE OF CORRECTION

PATENT NO.      : 9,035,507 B2                                    Page 1 of 2
APPLICATION NO. : 13/752942
DATED           : May 19, 2015
INVENTOR(S)     : Wirsch, Jr. et al.

It is certified that error appears in the above-identified patent and that said Letters Patent is hereby corrected as shown below:

In Column 3, Line 16, delete "buss bars 62, DC buss" and insert -- bus bars 62, DC bus --, therefor.

In Column 3, Line 19, delete "buss" and insert -- bus --, therefor.

In Column 3, Line 21, delete "buss" and insert -- bus --, therefor.

In Column 3, Line 22, delete "buss" and insert -- bus --, therefor.

In Column 3, Line 25, delete "buss" and insert -- bus --, therefor.

In Column 3, Line 27, delete "buss" and insert -- bus --, therefor.

In Column 3, Line 32, delete "buss" and insert -- bus --, therefor.

In Column 3, Line 34, delete "buss" and insert -- bus --, therefor.

In Column 3, Line 47, delete "buss" and insert -- bus --, therefor.

In Column 3, Line 50, delete "buss" and insert -- bus --, therefor.

In Column 3, Line 53, delete "buss" and insert -- bus --, therefor.

In Column 3, Line 55, delete "buss" and insert -- bus --, therefor.

In Column 4, Line 8, delete "buss" and insert -- bus --, therefor.

In Column 4, Line 13, delete "buss" and insert -- bus --, therefor.

In Column 4, Line 15, delete "buss" and insert -- bus --, therefor.

Signed and Sealed this
Second Day of August, 2016

Michelle K. Lee
*Director of the United States Patent and Trademark Office*

CERTIFICATE OF CORRECTION (continued)
U.S. Pat. No. 9,035,507 B2

In Column 5, Line 26, delete "buss" and insert -- bus --, therefor.

In Column 5, Line 28, delete "buss" and insert -- bus --, therefor.

In Column 5, Line 41, delete "buss" and insert -- bus --, therefor.